United States Patent [19]

Kondo et al.

[11] Patent Number: 4,894,819
[45] Date of Patent: Jan. 16, 1990

[54] DATA TRANSMISSION METHOD IN OPTICAL STAR NETWORK AND OPTICAL STAR NETWORK SYSTEM FOR REALIZING THE SAME

[75] Inventors: Toshinori Kondo; Takao Okikawa, both of Tokyo, Japan

[73] Assignee: Kabushiki Kaisha Toshiba, Kawasaki, Japan

[21] Appl. No.: 241,266

[22] Filed: Sep. 7, 1988

[30] Foreign Application Priority Data

Sep. 9, 1987 [JP] Japan .................................. 62-225510
Sep. 14, 1987 [JP] Japan .................................. 62-230001

[51] Int. Cl.$^4$ ................................................ H04J 3/26
[52] U.S. Cl. .......................................... 376/4; 370/94.3
[58] Field of Search ...................... 370/4, 60, 85, 94; 340/825.5, 825.52; 455/617

[56] References Cited

U.S. PATENT DOCUMENTS

4,706,246 11/1987 Kume ..................................... 370/85

*Primary Examiner*—Robert L. Griffin
*Assistant Examiner*—Melvin Marcelo
*Attorney, Agent, or Firm*—Oblon, Spivak, McClelland, Maier & Neustadt

[57] ABSTRACT

An optical star network system, wherein a first packet is transmitted between first and second terminals, which are functionally coupled to an optical star network, using a predetermined wavelength band in accordance with the CSMA/CD system, which system comprises a generation section for generating a second packet including transmission data and having a predetermined bit length, and a transmission section for transmitting the second packet on a transmission path using the predetermined wavelength band. The predetermined bit length is set so as not to be equal to an integer multiple of a bit length of a data unit of the first packet. The second packet includes dummy data with the transmission data following this dummy data, the bit length of the dummy data is greater than the bit length of the longest data packet which is to be transmitted before interruption of transmission of the first packet, when the first and second packets collide with each other.

18 Claims, 8 Drawing Sheets

DATA TRANSMISSION METHOD IN OPTICAL STAR NETWORK AND OPTICAL STAR NETWORK SYSTEM FOR REALIZING THE SAME

BACKGROUND OF THE INVENTION

1. Field of the Invention

The present invention relates to a data transmission method in an optical star network used in, for example, an optical LAN (Local Area Network), and an optical star network system that realizes the method.

2. Description of the Related Art

Recently, optical LANs are being put to practical use in different fields, owing to the broad band characteristic and electromagnetic interference proof characteristic of optical fibers which serve as optical paths. Of these optical LANs, there is one which has been receiving attention due to high reliability of its components and its capability to provide a complex system by means of wave multiplex. This type utilizes a passive optical star coupler, serving as a center node, whose optical path can be constituted entirely by passive parts, and a CSMA/CD (Carrier Sense Multiple Access/Collision Detection) as an access system.

Figure 1:
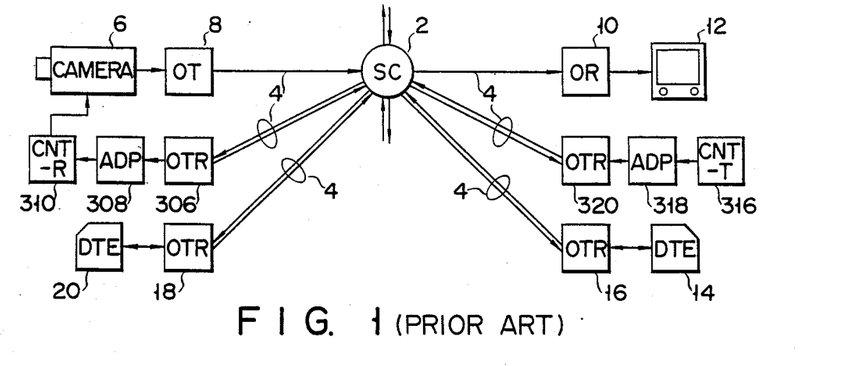
FIG. 1 is a schematic diagram illustrating the structure of a prior art data transmission system in an optical star network.

FIG. 1 exemplifies a prior art system of this type, which can perform data transmission and video signal transmission. In this system, optical fiber transmission paths 4 radially extend from optical star coupler (SC) 2 serving as a center node. A plurality of data terminals (DTE) 14 and 20 are coupled through respective optical transceivers (OTR) 16 and 18 to these optical transmission paths 4. Camera 6 and monitor device 12 are coupled to optical star coupler 2 respectively through optical transmitter (OT) 8 and optical receiver (OR) 10. Further, controller (CNT-R) 310 for camera 6 and another controller (CNT-T) 316 for giving a control command to controller 310 are coupled to optical star coupler 2 through optical transceiver (OTR) 306 and adapter (ADP) 308, and OTR 320 and ADP 318, respectively.

In thus constructed optical LAN, data transmission between DTEs 14 and 20 is performed according to the CSMA/CD system. When it is confirmed that no data transmission from other data terminals, for example, DTE 14 generates a data packet (main data packet) and performs Manchester conversion of the data packet. The converted packet is sent to OTR 16 for another Manchester conversion (double Manchester conversion). Then, it is modulated to be an optical signal and is sent to optical star coupler 2. In contrast, OTR 18 subjects the data packet optical signal coming through optical star coupler 2 first to partial response conversion and then reproduces a Manchester code. This reproduced Manchester code is sent to DTE 20 where the data packet is reproduced. If data packets are simultaneously transmitted from two or more DTEs, there would be a collision of optical signals corresponding to the data packets in optical star coupler 2 or on optical paths 4. This collision is detected as failure in coding rule of Manchester conversion by the individual OTRs. When collision of optical signals is detected, each OTR temporarily stops transmitting the optical signal at that moment and starts transmitting the optical signal again after a given time In this case, when another optical signal has already been transmitted, each OTR starts transmitting the optical signal upon completion of transmission of another optical signal.

In transmitting a video signal from camera 6 to monitor device 12, the video signal attained by camera 6 is modulated by OT 8 to be an optical signal of a waveband different from that of the aforementioned main data packet and is sent onto optical transmission paths 4. OR 10 on the side of monitor device 12 photoelectrically converts the optical video signal coming through optical star coupler 2 into a video signal. This reproduced video signal is supplied to, and displayed on, monitor device 12. At this time, although OR 10 receives a main data packet optical signal, etc. besides the optical video signal, such an optical signal as the main data packet is eliminated by a filter Therefore, monitor device 12 displays only the video signal from camera 6, which ensures a local area monitoring, using an ITV camera, for example.

In effecting a local area monitoring using the above optical LAN system, it is necessary to remotely control the visual field or the like for image pickup of a camera by sending control data to the camera side from the monitoring device side. This control data is conventionally sent to controller 310 from controller 316 as follows. As well as data transmission between DTEs 14 and 20, first, OTR 320 checks whether or not another OTR or OT in the system is transmitting an optical signal in accordance with the CSMA/CD system. When it is determined that no optical signal is being transmitted, the control data generated from CNT-T 316 is into a packet in ADP 318 and is converted, by OTR 320, into an optical signal which is then sent on optical transmission paths 4. On the side of camera 6, by way of contrast, the optical signal coming via optical transmission paths 4 is subjected to photoelectric conversion in OTR 306 and the control data is then reproduced from the optical signal by ADP 308. CNT-R 310 controls the visual field or the like of camera 6 in accordance with this control data.

With such a prior art system, however, since the control data is transmitted according to the CSMA/CD system as well as data transmitted between DTEs 14 and 20, various devices used for control data transmission become complicated and enlarged. This accordingly enlarges, and increases the cost of, the network system.

SUMMARY OF THE INVENTION

Accordingly, it is an object of this invention to provide a data transmission method for transmitting transmission data by means of a simple structure, and an optical star network system for realizing the method.

To achieve the object, there is provided an optical star network system for transmitting a first packet between first and second terminals using a predetermined wavelength band, which system comprises generation means for generating a second packet, including transmission data and having a predetermined bit length, and transmission means for transmitting the second packet on a transmission path using the predetermined wavelength band. This predetermined bit length is not equal to an integer multiple of the bit length of a data unit of the first packet. The second packet includes dummy data and the aforementioned transmission data following the dummy data, whose bit length is greater than a bit length of the longest packet that is transmitted before interruption of transmission of the first packet, when collision of the first and second packets occurs.

To achieve the above object, there is provided a data transmission method for transmitting a first packet between first and second terminals using a predetermined wavelength band, which method comprises the steps of generating a second packet, including transmission data and having a predetermined bit length not equal to an integer multiple of the bit length of a data unit of the first packet, and transmitting the second packet on a transmission path using the predetermined wavelength band.

As described above, according to this invention, a control data packet is prepared which has a predetermined bit length and includes control data. This control data packet is transmitted with a predetermined interval in the same wavelength band as a main data packet. This ensures accurate transmission of the control data without using the CSMA/CD system and can therefore provide a data transmission system in an optical star network, whose structure is simplified and made smaller.

Even with a repeater in use due to controllers being remote from each other, the control data packet can be accurately transmitted.

DETAILED DESCRIPTION OF THE PREFERRED EMBODIMENTS

An optical star network system according to this invention will be described in detail below referring to the accompanying drawings.

Figure 2:
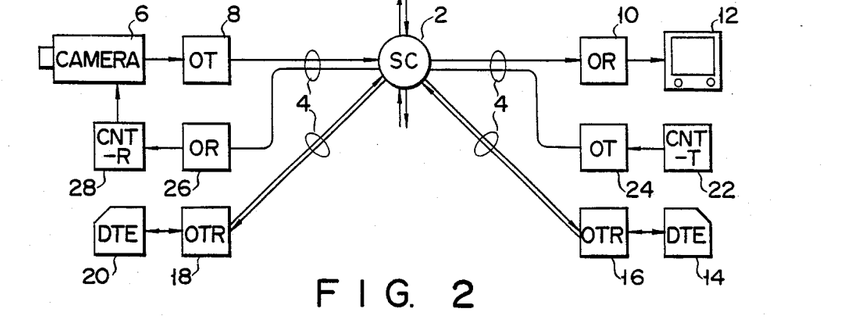
FIG. 2 is a schematic diagram illustrating the structure of a data transmission system in an optical star network according to the first embodiment of this invention.

FIG. 2 illustrates the arrangement of an optical star network system according to the first embodiment of this invention. The same numerals in FIGS. 1 and 2 identify identical components, so that a detailed description of those in FIG. 2 will be omitted.

Controller (CNT-T) 22 prepares a control data packet from control data supplied from an operation panel (not shown). This control data packet is transmitted, by optical transmitter (OT) 24, onto optical transmission paths 4 at a given period T0, using the same wavelength band as the main data packet transmitted from data terminal 14.

Figure 7A:
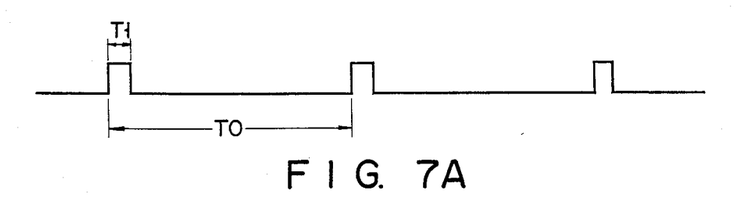
FIG. 7A is a diagram illustrating the transmission status of a control data packet according to the first embodiment.
Figure 7B:
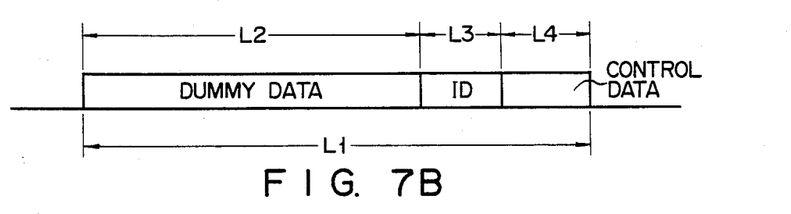
FIG. 7B is a diagram illustrating the format of the control data packet according to the first embodiment.

The control data packet includes dummy data, identification data, and control data as shown in FIG. 7B. When collision of main data packets occurs, length L2 of the dummy data is set to be greater than the maximum packet length that is transmitted until transmission of the main data packet has stopped. Length L1 of the control data packet is set so as not to be equal to an integer multiple of 8 bits which are the transmission unit of the main data packet. According to the optical star network system of this invention, as the transmission rate between controllers (CNT-T) 22 and (CNT-R) 28 is determined in advance, the transmission time corresponds to the bit length of a packet.

A control data packet is received by optical receiver (OR) 26 through an optical star coupler 2 and optical transmission paths 4. Control data is retrieved from the received packet and camera 6 is controlled in accordance with the control data.

The arrangement of controller 22 will be described below referring to FIG. 3.

Controller 22 has CPU 40 for controlling the operation of the entire controller. CPU 40 does not receive signal CD in the first embodiment. ROM 44 generates dummy data and identification data in accordance with a control signal from CPU 40. Memory (MEM) 42 stores a control data packet. CPU 40 reads out a packet from memory 42 in accordance with an interruption from timer 46 and sends it via interface 50 to optical transmitter 24. Timer 46 measures time T0 in accordance with a control signal from CPU 40. Counter 48 counts the number of bits of the dummy data generated from ROM 44 in accordance with a control signal from CPU 40. A control command for controlling the operation of camera 6 is entered through panel 52. The control data specified by the control command is written in memory 42.

Figure 5:
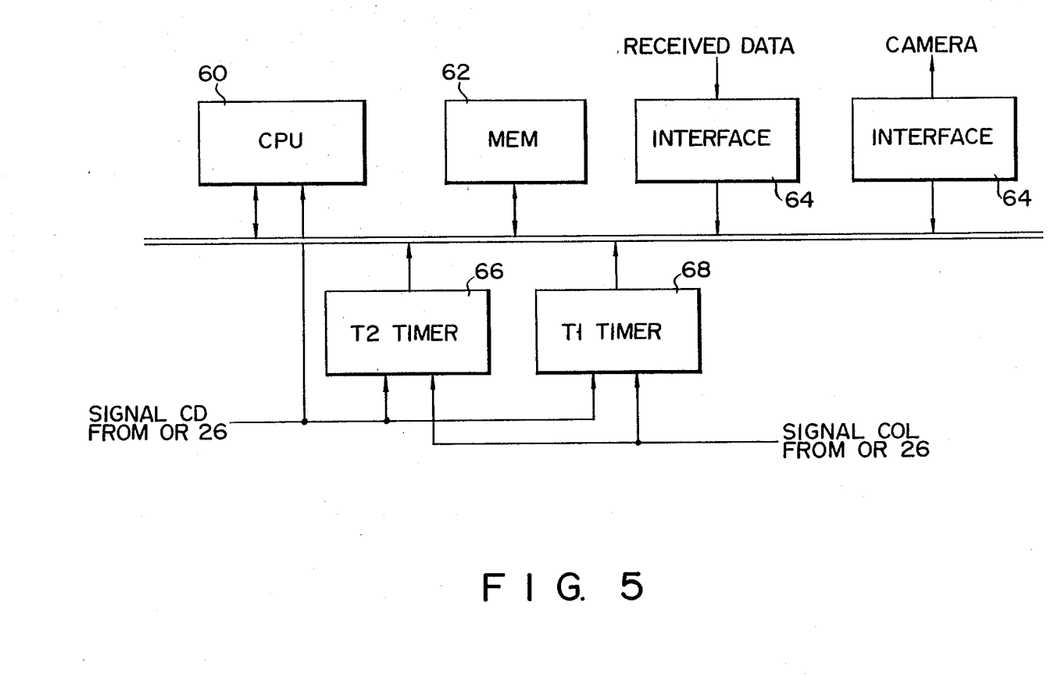
FIG. 5 is a block diagram illustrating the arrangement of a receiver's s controller.

The arrangement of controller (CNT-R) 28 will now be described referring to FIG. 5.

Controller 28 has CPU 60 for controlling the operation of the whole of controller 28. Timers 66 and 68 measure times T2 and T1 in accordance with carrier detection signal CD and collision detection signal COL, both from optical receiver 26. Memory (MEM) 62 stores control data included in a control data packet. CPU 60 receives the packet from optical receiver 26 through interface 64 in accordance with an interruption from timer 66 and stores the received packet in memory 62. The control data stored in memory 62 is sent to camera 6 through interface 64.

Figure 4A:
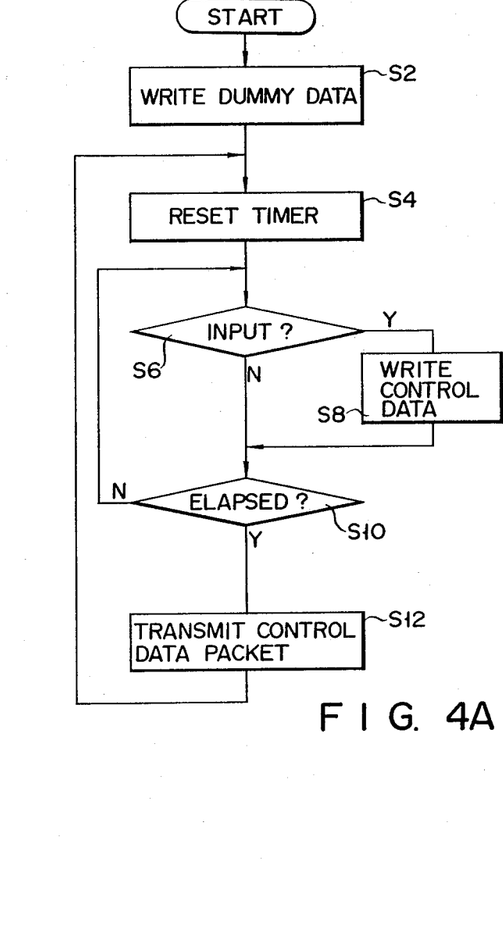
FIG. 4A is a flowchart for explaining the operation of the sender's controller.
Figure 6:
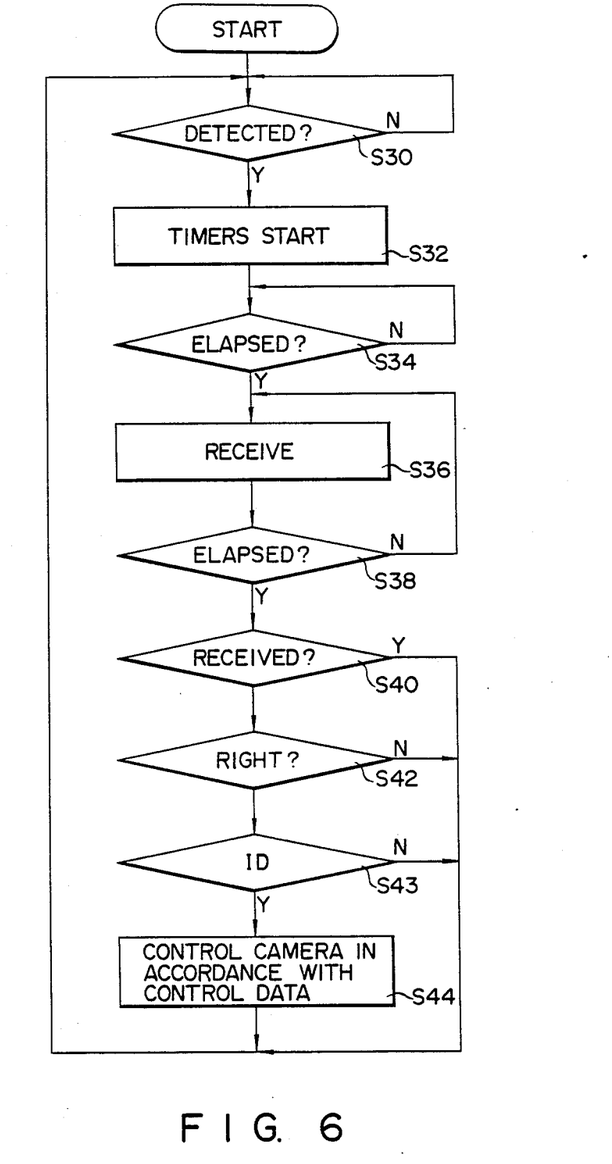
FIG. 6 is a flowchart for explaining the operation of the receiver's controller.

The operation of the first embodiment will be described below referring to FIGS. 4A and 6.

When the power for controller 22 is turned on, in step S2, dummy data is sequentially read out from ROM 44, in accordance with a control signal from CPU 40 until the number of dummy data bits counted by counter 48 reaches a predetermined number corresponding to bit length L2, and is stored in a predetermined position of memory 42, i.e., in a dummy data field of a packet generation field. Then, identification data is read out from ROM 44 and is stored in an identification data field. In the next step S4 timer 46 is reset, and in the subsequent steps S6, S8 and S10, the inputting of control data and the lapse of time T0 are checked. When a control command is entered through panel 52 before time T0 elapses, the control data is determined in accordance with the control command and is stored in a control data field of the packet generation field. When the control command is not entered, the previous control data is retained. In this case, for example, the control data may be made to be sequentially stored in the control data field in accordance with a predetermined program, instead of a control command entered from the panel.

If it is determined in step S10 that time T0 has elapsed, a control data packet is read out from memory 42 and is sent to optical transmitter 24. An optical signal attained through modulation in optical transmitter 24, as in the case of the prior art, is transmitted onto optical transmission paths 4. Thereafter, the flow returns to step S4, and the above operation is repeated.

The control data packet is transmitted in step S12, irrespective of whether or not a main data packet is being transmitted from another data terminal, for example, terminal 14. If such a packet transmission is indeed in progress, and the control data packet is transmitted through transmitter 24, collision of optical signals naturally occurs. As a result, packet transmission from terminal 14 is stopped after it has been transmitted by the minimum packet length. The control data is, however, transmitted to controller 28 from transmitter 24 irrespective of the collision. With or without the occurrence of such a collision, the control data packet is abandoned as an abnormal packet in other data terminals, since the bit length thereof is not equal to an integer multiple of 8 bits.

Optical receiver 26 detects a carrier of an optical signal in step S30. Upon detection of the carrier, the signal CD is supplied to timers 66 and 68 which in turn start measuring the time in step S32. In step S34 it is determined whether or not time T2 corresponding to bit length L2 has lapsed. If the collision of optical signals is detected by receiver 26 before time T2 has elapsed and before signal COL has been supplied to timers 66 and 68, these timers are reset. Thereafter, time T2" is measured. Time T2" is shorter than T2 because there should be a time for detecting the collision.

If it is determined in step S34 that time T2 or T2" has elapsed, data following the L2 bits from the head of the control data packet is received and stored in memory 62. In step S40 it is discriminated, referring to the value of timer 68, whether or not data transmission is still occurring. This can be discriminated since there should be no optical signal transmitted on transmission paths 4, if data indicated by L3 and L4 in FIG. 7B are stored in memory 62 and the packet is a control data packet.

If a carrier is detected in step S40, the received data is abandoned. In the next step S42 it is checked to determine whether or not the number of bits received is equal to the sum of L3 and L4. If they are not equal to each other, the received data is abandoned, and if they are equal to each other, it is discriminated in step S43 whether or not identification data exists. With no identification data existing, the received data is abandoned as in the previous step. If the identification data is detected, control data is read out and camera 6 is controlled in accordance with this control data, in step S44.

Video data is transmitted from optical transmitter (OT) 8 to optical receiver (OR) 10 using a different wavelength band. Receiver 10 has a separator (not shown) so that it only allows the wavelength band of video data to pass therethrough. In this manner, the video data is displayed on monitor device 12.

When a control data packet (packet length L1) is transmitted at a given period of time T0 as described above, the throughput of a main data packet transmitting system is reduced (T1/T0). Since the swinging speed of camera 6 is as low as, for example, 5°/sec, the transmission rate of the control data packet can be reduced. Therefore, reduction in throughput of the main data packet transmitting system can be determined to be $T1/T0 \leq 1\%$ and can thus be ignored.

The control data packet is distributed to optical star coupler 2 and is thus received by optical transceivers 16 and 18, etc., beside optical receiver 26, which are included in the main data packet transmitting system. However, since the length of the control data packet is set to not be equal to an integer multiple of 8 bits, this packet is regarded as an abnormal packet by optical transceivers 16 and 18 of the main data packet transmitting system. Therefore, the control data packet has no adverse effects on the main data packet transmitting system.

Since the control data packet is cyclically transmitted, it may collide with optical signals of the main data packet transmitting system at optical star coupler 2 or paths 4. As described earlier, however, according to this embodiment, the control data packet includes dummy data and control data following the former data, and length L2 of the dummy data is set to be greater than the maximum packet length (the minimum packet length of the main data packet transmitting system) set for the case wherein collision occurs in the main data packet transmitting system. Even in the case wherein the control data packet collides with the main data packet, this collision always ends within the dummy data period L2. Accordingly, the control data can assuredly be transmitted without being influenced by the collision. The identification data may be omitted; in this case, step S43 in FIG. 6 can be eliminated.

As described above, according to this embodiment, a control data packet can surely be transmitted without adversely influencing transmission of a main data packet or without being influenced by the collision. Further, since this embodiment permits control data to be transmitted independently of the main data packet transmitting system, without using the CSMA/CD system, the transmission control is simplified and the arrangement of the control data packet transmitting system can be simplified and made smaller This eventually results in a more simplified network system at a reduced cost.

A description will now be given of the second embodiment.

Figure 7C:
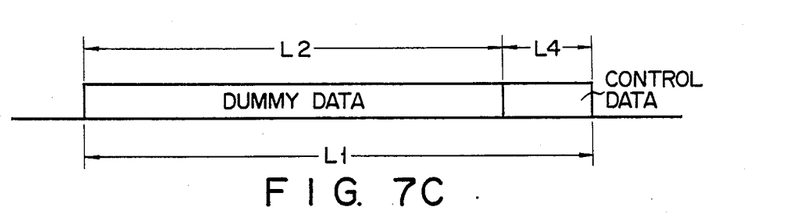
FIG. 7C is a diagram illustrating the format of the control data packet according to the second embodiment.

According to the second embodiment of the present invention, when a carrier is present on transmission path 4, the transmission of a control data packet is postponed until no carrier is present on the path. Controller 22 in this embodiment has the same structure as the one shown in FIG. 3 except that optical transmitter 24 has a carrier detector (not shown) which sends a carrier detection signal CD to CPU 40 upon detection of a carrier and that timer 46 is not used. Controller 8 has the same structure as shown in FIG. 5. FIG. 7C illustrates the format of a control data packet; as should be clear from this figure, the control data packet used in the second embodiment, unlike the one shown in FIG. 7B, has no identification data.

The operation of the second embodiment will now be described.

Figure 4B:
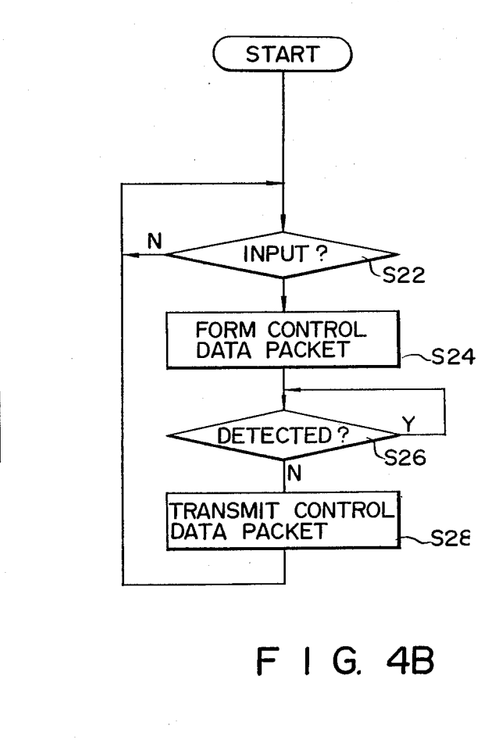
FIG. 4B is a flowchart for explaining the operation of a sender's controller according to the second embodiment.

In step S22 of FIG. 4B it is determined whether or not a control command has been entered through panel 52. If the command is inputted, CPU 40 writes dummy data generated from ROM 44 at a given location in memory 42. Subsequently, control data determined in accordance with the control command is written in memory 42. Upon completion of the writing operation, input of a carrier detection signal CD is waited in step S26. If it is confirmed in step S26 that no carrier is present on transmission path 4, a control data packet stored in memory 42 is transmitted on transmission path 4 in step S28.

The operation of controller 28 is the same as the one used in the first embodiment. Since no identification data is included in a control data packet in the second embodiment, step S43 can be omitted.

Figure 8:
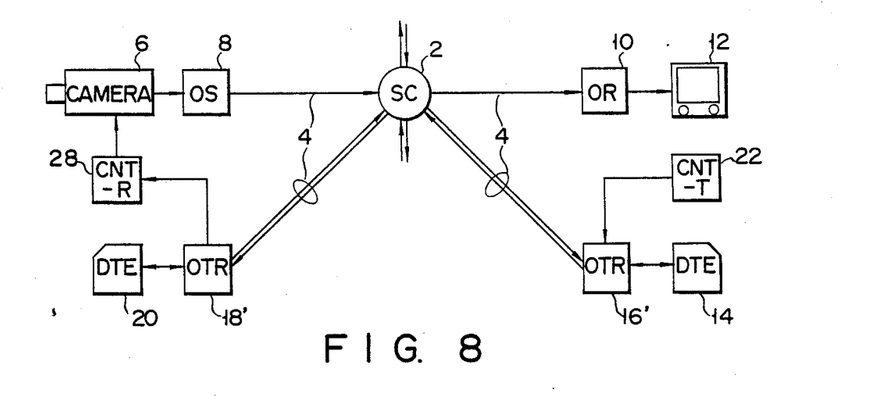
FIG. 8 is a schematic diagram of a data transmission system in an optical star network according to the third embodiment of this invention.

Referring to FIG. 8 the third embodiment will be described below.

Optical transceivers (OTR) 16' and 18' have the functions of both optical transceivers (OTR) 16 and 18 and those of optical transmitter (OT) 24 and optical receiver (OR) 26 shown in FIG. 2. When OTR 18' receives a control data packet, the packet is sent, as an abnormal packet, to controller 28, whereby camera 6 is controlled.

Figure 9:
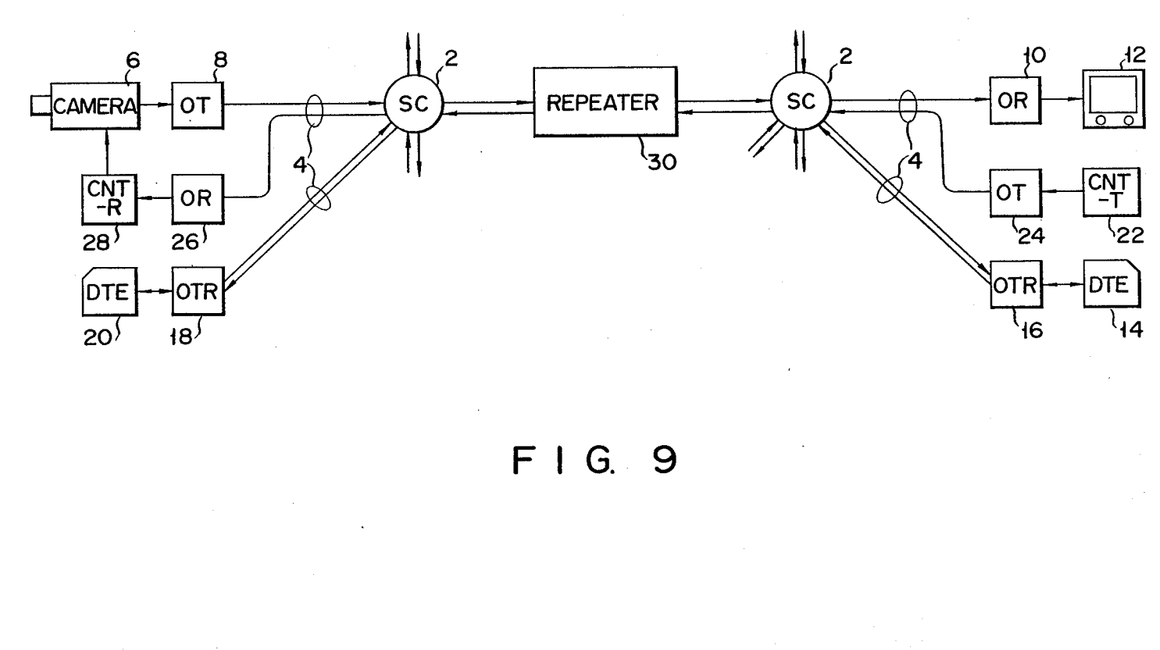
FIG. 9 is a schematic diagram of a data transmission system in an optical star network according to the fourth embodiment of this invention.

Referring to FIG. 9, the fourth embodiment will now be described.

FIG. 9 illustrates the arrangement of an optical star network system according to the fourth embodiment. The same numerals in FIGS. 2 and 9 identify identical parts, so that a detailed description of those in FIG. 9 will be omitted. The fourth embodiment differs from the first embodiment in that repeater 30 for executing reproduction/relaying of a packet is provided between star couplers 2.

Figure 11:
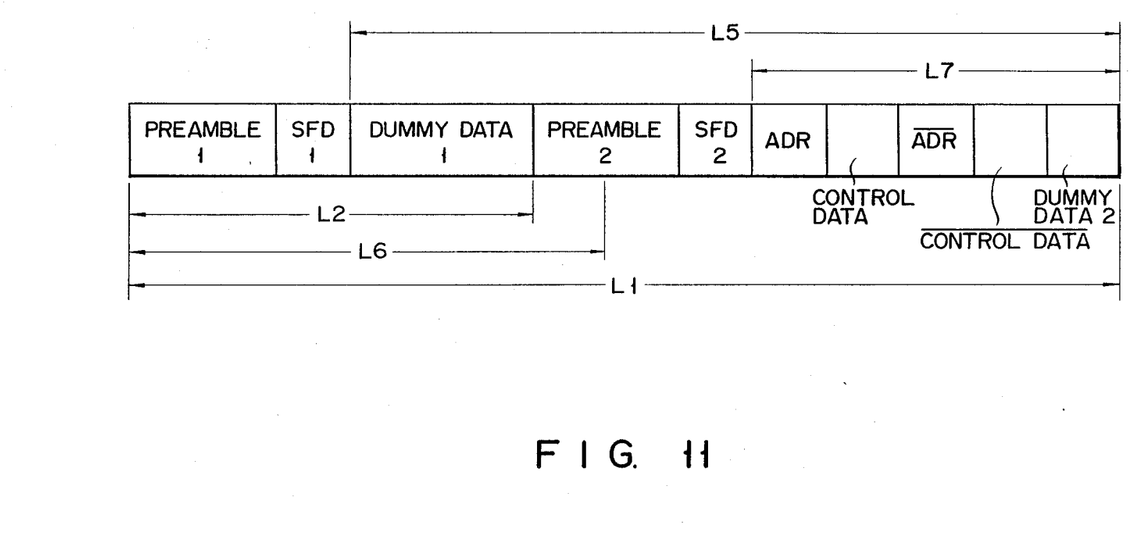
FIG. 11 is a diagram illustrating the frame format of a control data packet according to the third embodiment.

FIG. 11 illustrates the frame format of a control data packet sent from controller 22 according to the fourth embodiment. This control data packet has a dummy data section, which is made up of a first preamble at the head, first start frame delimiter (SFD1) and first dummy data, with a second preamble, second start frame delimiter (SFD2), destination address ADR and control data for a camera following the dummy data section in the named order. And, following the control data are inverted data of the destination address ADR and the control data, with second dummy data coming at the end of the control data packet. Length L2 of the dummy data section is set greater than the maximum packet length (normally, the transmission unit packet length of a main data packet) that is be transmitted until transmission of a main data packet is stopped, when collision of main data packets occurs. Bit length L5 from the end of first start frame delimiter SFD1 to the frame end is set so as to be not equal to an integer multiple of 8 bits. After existence of no carriers on optical transmission path 4 is confirmed, thus formatted control data packet is modulated by optical transmitter (OT) 24 to be an optical signal of the same wavelength band as the main data packet and is then sent onto optical transmission path 4.

Figure 3:
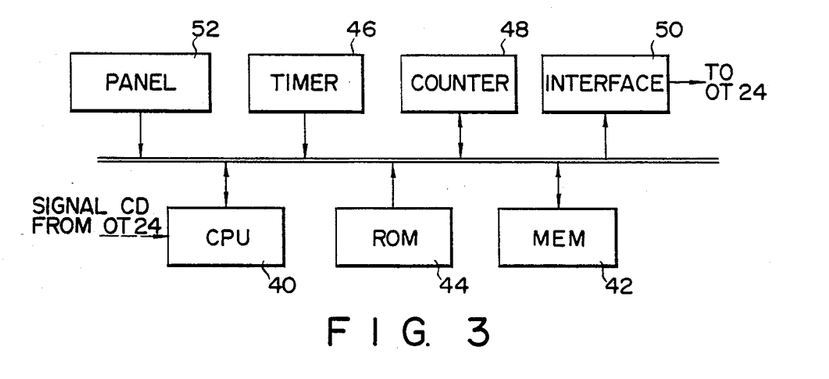
FIG. 3 is a block diagram illustrating the arrangement of a sender's controller.

The fundamental arrangement of controller 22 is as shown in FIG. 3; the differences are as follows. In the flowchart shown in FIG. 4A, in addition to generation of dummy data from ROM 44, the first and second start frame delimiters and the first and second preambles are written in memory 42 in step S2. If it is detected in step S6 that a control command is entered through panel 52, control data and a destination address determined according to the control command are written in memory 42. When there are a plurality of cameras, therefore, the address assigned to that controller which corresponds to an object camera to be controlled is written as the destination address. If it is discriminated in step S10 that time T0 has elapsed, it is then checked by transmitter 24 if a carrier is present as step S26 shown in FIG. 4B. If no carriers are detected, CPU 40 responds to carrier detection signal CD and sends the control data packet onto transmission path 4 through transmitter 24.

Figure 10:
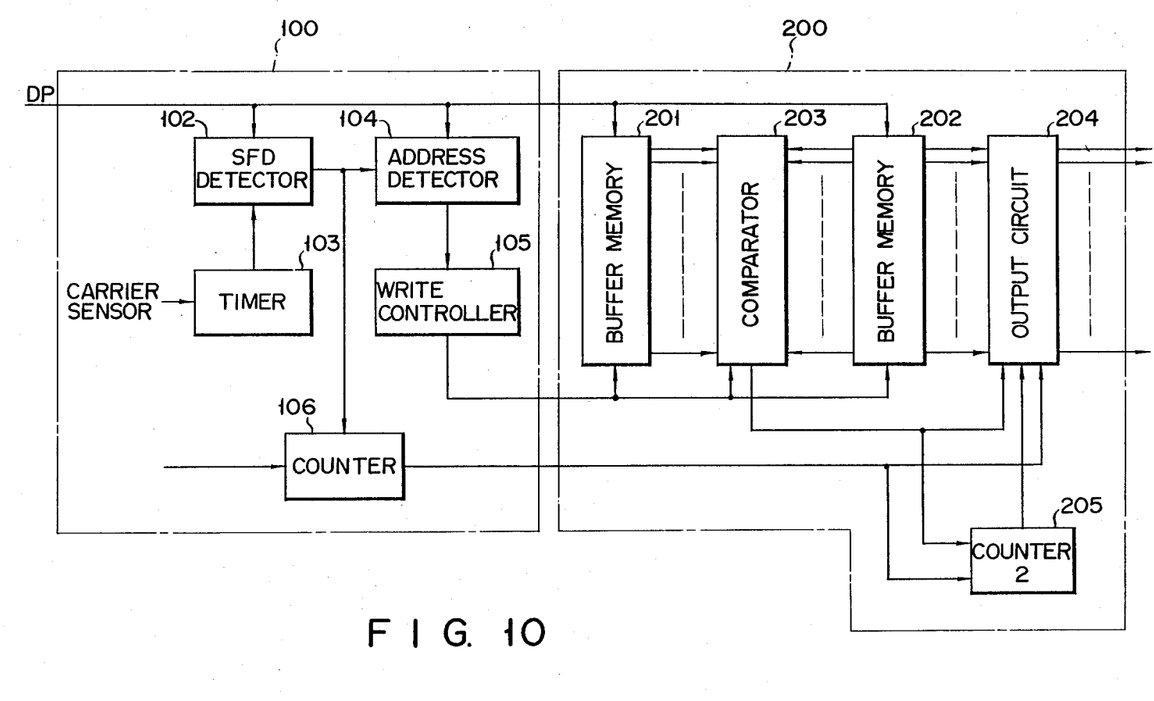
FIG. 10 is a block diagram illustrating the arrangements of a receiver's controller 28 and an optical receiver 26 of this controller 28.

FIG. 10 illustrates the arrangement of controller 28 provided close to camera 6. This controller 28 has its components roughly separated into an address collation section 100 and a control data input section 200.

Address collation section 100 includes SFD detector 102 for detecting start frame delimiter SFD2, timer 103, address detector 104, writer controller 105 and first counter 106. Timer 103 starts measuring the time in response to carrier detection signal CD and provides SFD detector 102 with a detection permit signal upon elapse of a predetermined time T6, corresponding to bit length L6, which is set as:

$T2 \leq T6 \leq T2 +$ Bit transmission time for second preamble bits.

Address detector 104 starts functioning when SFD2 is detected by SFD detector 102, and receives the destination address following SFD2 and discriminates whether or not the destination address coincides with the intraaddress. If both addresses coincide with each other, address detector 104 sends a coincidence signal to write controller 105. Upon reception of the coincidence signal, write controller 105 controls the writing of control data and its inverted data into buffer 201 (which will be described later) of control data input section 200. First counter 106 starts its counting operation at the time a detection output is generated from SFD detector 102, detects bit length L7 from the end of SFD2 to the frame end (the end of dummy data 2) and sends the value to an output circuit 204 of control data input section 200.

Control data input section 200 comprises two buffers 201 and 202, comparator 203, aforementioned output circuit 204 and second counter 205. Buffers 201 and 202 respectively store control data and its inverted data, which are included in the received control data packet. Comparator 203 compares the control data with the inverted data to discriminate whether or not the latter data is the inverted version of the control data, and sends a coincidence signal to output circuit 204. When this coincidence signal indicates coincidence between the control data and inverted data and bit length L7 supplied from first counter 106 of address collation section 100 is a defined length, output circuit 204 considers the control data stored in buffer 202 as proper data and sends the control data to a control section (not shown) of camera 6. If a control data packet does not come within transmission interval T0 of that packet, second counter 205 generates a reset signal to reset output circuit 204 to the initial state.

With the above arrangement, when an operator at monitor device 12 operates operational panel 52 of controller 22 and enters, for example, a command to rotate camera 6, controller 22 sets control data corresponding to the rotation command together with a destination address in a control data packet that is periodically generated at a cycle of T0 and sends the packet to optical transmitter 24. Optical transmitter 24 in turn modulates the received control data packet to provide an optical signal of the same wavelength band as a main data packet, and sends the optical signal onto optical transmission paths 4. The control data packet is reproduced and relayed by repeater 30 and is sent to receiver 26 through star coupler 2.

On the side of camera 6, when the optical signal of the data packet is received at optical receiver 26, this data packet is supplied to address collation section 100 of controller 28. In response to carrier detection signal CD from receiver 26, address collation section 100 stops latching a data packet during the measured time T6 of timer 103, i.e., the period indicated by bit length L6 shown in FIG. 11, and starts detecting SFD2 upon elapse of T6. Therefore, even if collision of main data packets on optical star coupler 2 has occurred at this moment, this collision is surely completed during T6 so that the packet collision has no influence on transmission of the control data packet.

When detecting SFD2 upon elapse of holding time T6, address collation section 100 discriminates whether or not the address signal coming to address detector 104 following the SFD2 coincides with the intra-address. Upon detection of address coincidence, address collation section 100 discriminates that the received data packet is the control data packet that is destined for intracontroller, and writes the control data and its inverted data included in this control data packet in buffers 201 and 202 of control data input section 200. When no address coincidence is attained, address collation section 100 discriminates that the received data packet is not destined for intra-controller, writes no control data in the buffers and abandons the received packet. This can surely eliminate a main data packet and any data packet which is destined for other controllers.

Upon completion of writing control data and its inverted data into buffers 201 and 202, control data input section 200 permits comparator 203 to compare the control data with the inverted data. When the inverted version of the control data coincides with the received inverted data, comparator 203 sends a coincidence signal to output circuit 204. At this time, first counter 106 of address collation section 100 counts the time T7 corresponding to the bit length from the end of SFD2 to the frame end, and output circuit 204 is informed of the counting result. As a result, when the coincidence signal is sent from comparator 203 and when the count value of first counter 106 is a specified value, output circuit 204 discriminates that the proper control data has been received and sends the control data stored in buffer 202 to the control section of camera 6. In response to the control data, the control section of camera 7 rotates the camera by a predetermined angle, for example. In this manner, remote control of camera 6 is effected.

According to the above embodiment, a control data packet is distributed by optical star coupler 2 and is received by optical receivers 16 and 18 of the main data packet transmission system, as well as by optical receiver 26. However, since bit length L5 from the end of SFD1 of a control data packet to the frame end is set to be not equal to an integer multiple of 8 bits, as described earlier, this packet is regarded as an abnormal packet, and is abandoned, by optical transceivers 16 and 18 of the main data packet transmitting system. Therefore, the control data packet would have no adverse influence on the main data packet transmitting system.

According to this embodiment, a destination address is included together with control data in a control data packet which is then transmitted, and on the receiver's side, the destination address is compared with the address of a receiver's controller, and the control data of the received packet is latched only when both addresses coincide with each other. This can surely eliminate main data packets and control data packets which are destined for other controllers, and can permit the controller to receive only the control data of the control data packet destined to itself. Therefore, camera 6 can always and surely be controlled and the reliability of the system can be improved. Further, according to this embodiment, since a preamble and delimiter SFD1 as well as dummy data are included in the dummy data section, control data can be relayed and transmitted without problems in a system provided with a repeater. When a control data packet is received by data terminals 14 and 20, it is accurately detected that the length of the packet is not equal to an integer multiple of 8 bits, thereby surely eliminating the improper control data packet. In addition, as a preamble and delimiter SFD2 are provided prior to the destination address, this address can accurately be detected. Moreover, on the sender's side, inverted data is added following the destination address and control data, respectively, and the resultant control data packet is then transmitted, and, on the receiver's side, the destination address and control data are compared with their respective inverted data, and this control data is latched as the proper data when the comparison is satisfactory. Therefore, a bit error can be eliminated and the proper control data can always be received and used for controlling camera 6.

Needless to say, this invention is not limited to the above particular embodiments. For instance, for a system without a repeater, delimiter SSFD1 of the dummy data section need not be transmitted, or the preamble and delimiter SFD2 which are set prior to the destination address may be omitted.

What is claimed is:

1. An optical star network system wherein a first packet is transmitted between first and second terminals, which are functionally coupled to an optical star network, using a predetermined wavelength band in accordance with a CSMA/CD (Carrier Sense Multiple Access/Collision Detection) system, said optical star network system comprising:

generation means in a third terminal for generating a second packet having a predetermined bit length and including dummy data, a bit length of said dummy data being greater than a maximum bit length of said first packet which is transmitted before interruption of transmission of said first packet, when collision of said first and second packets occurs, the predetermined bit length of said second packet being not equal to an integer multiple of a bit length of a data unit of said first packet; and transmission means for transmitting said second packet to a fourth terminal through a transmission path using said predetermined wavelength band.

2. The system according to claim 1, wherein said second packet further includes identification data between said dummy data and said transmission data, and said generation means comprises means for transmitting said second packet to said transmission means for every predetermined time irrespective of whether or not said first packet is being transmitted.

3. The system according to claim 2, wherein said first and second packets are transmitted using a carrier of said wavelength band, and
said system further comprises reception means for detecting a carrier on said transmission path, detecting collision of said first and second packets, detecting said identification data in accordance with one of said detected carrier and said detected collision, and for receiving said transmission data in accordance with said detected identification data.

4. The system according to claim 1, wherein said first and second packets are transmitted using a carrier of said wavelength band, and
said generation means comprises means for detecting a carrier of said wavelength band and for transmitting said second packet to said transmission means when said wavelength band is detected not in use from said carrier.

5. The system according to claim 4, further comprising reception means for detecting said carrier and for receiving said transmission data from said second packet in accordance with a detection result.

6. The system according to claim 2, wherein said identification data is a destination address, and
said system further comprises reception means for detecting said destination address and for receiving said transmission data when said destination address coincides with an intra-address of said reception means.

7. The system according to claim 1, wherein said second packet includes an inverted address of a destination address and inverted data of said transmission data following said destination address and said transmission data, and
said system further comprises reception means for comparing said destination address of said second packet with said inverted address of said destination address, comparing said transmission data with said inverted data thereof, and for receiving said transmission data in accordance with the comparison results.

8. The system according to claim 1, wherein said system further comprises repeater means for executing reproduction and relaying of said second packet, and
said second packet includes first start a first preamble at a head thereof, second start data with a second preamble between said dummy data and said transmission data, and a destination address.

9. The system according to claim 8, further comprising reception means for counting a number of bits from said second start data to an end of said second packet, discriminating that a received packet is said second packet, and for receiving said transmission data when said counted number of bits is a predetermined value.

10. A data transmission method wherein a first packet is transmitted between first and second terminals, which are functionally coupled to an optical star network, using a predetermined wavelength band in accordance with a CSMA/CM (Carrier Sense Multiple Access/Collision Detection) system, said method comprising the steps of:
generating a second packet, having a predetermined bit length and including dummy data, a bit length of said dummy data being greater than a maximum bit length of said first packet which is transmitted before interruption of transmission of said first packet, when collision of said first and second packets occurs, the predetermined bit length of said second packet being not equal to an integer multiple of a bit length of a data unit of said first packet; and
transmitting said second packet to a transmission path using said predetermined wavelength band.

11. The method according to claim 10, wherein said second packet further includes identification data between said dummy data and said transmission data, and said second packet is transmitted for every predetermined time irrespective of whether or not said first packet is being transmitted.

12. The method according to claim 11, wherein said first and second packets are transmitted using a carrier of said wavelength band, and
wherein said method further comprises the step of detecting a carrier on said transmission path, detecting collision of said first and second packets, detecting said identification data in accordance with one of said detected carrier and said detected collision, and for receiving said transmission data in accordance with said detected identification data.

13. The method according to claim 10, wherein said first and second packets are transmitted using a carrier of said wavelength band, and
wherein said method further comprises the step of detecting a carrier of said wavelength band and transmitting said second packet when said wavelength band is detected not in use from said carrier.

14. The method according to claim 13, further comprising the step of detecting said carrier and receiving said transmission data from said second packet in accordance with a detection result.

15. The method according to claim 11, wherein said identification data is a destination address, and
wherein said method further comprises the step of detecting said destination address and receiving said transmission data when said destination address coincides with an address of a receiver.

16. The method according to claim 10, wherein said second packet includes an inverted address of a destination address and inverted data of said transmission data following said destination address and said transmission data, and
wherein said method further comprises the step of comparing said destination address of said second packet with said inverted address of said destination address, comparing said transmission data with said inverted data thereof, and receiving said transmission data in accordance with comparison results.

17. The method according to claim 10, wherein said method further comprises the step of executing reproduction and relaying of said second packet, and
wherein said second packet includes first start data with a first preamble at a head thereof, second start data with a second preamble between said dummy data and said transmission data, and a destination address.

18. The method according to claim 17, further comprising the step of counting a number of bits from said second start data to an end of said second packet, and discriminating that a received packet is said second packet, and receiving said transmission data when said counted number of bits is a predetermined value.

* * * * *